Aug. 14, 1928.  
V. G. VAUGHAN  
1,680,401  
CONTROL SYSTEM FOR RADIANT HEATERS  
Filed July 20, 1923
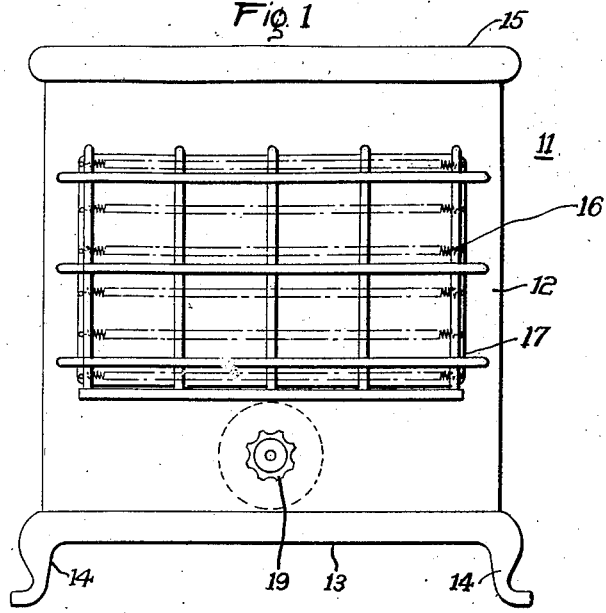
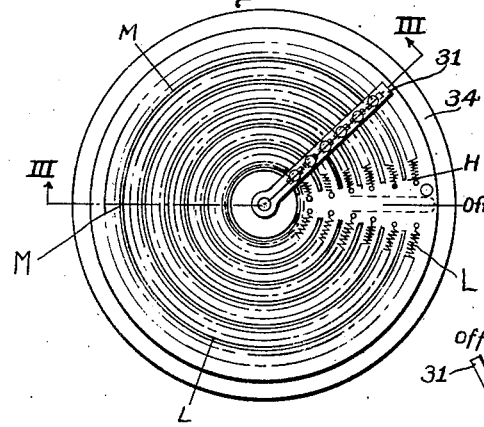
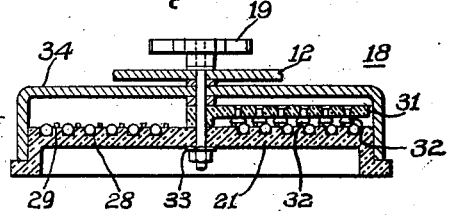
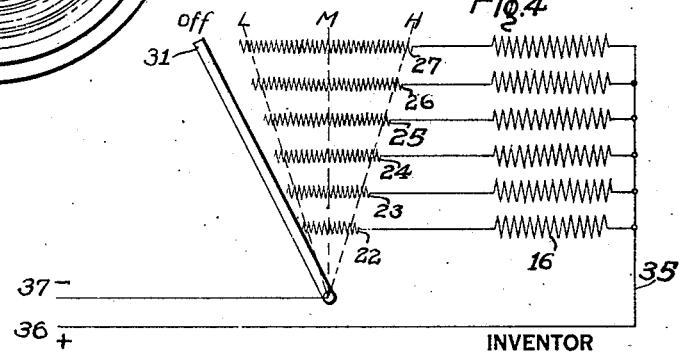
WITNESSES:
INVENTOR  
Victor G. Vaughan.  
BY  
ATTORNEY Patented Aug. 14, 1928.

1,680,401

UNITED STATES PATENT OFFICE.

VICTOR G. VAUGHAN, OF WILKINSBURG, PENNSYLVANIA, ASSIGNOR TO WESTINGHOUSE ELECTRIC & MANUFACTURING COMPANY, A CORPORATION OF PENNSYLVANIA.

CONTROL SYSTEM FOR RADIANT HEATERS.

Application filed July 20, 1923. Serial No. 652,664.

My invention relates to electric air heaters and particularly to methods of control of such heaters.

The object of my invention is to provide a relatively simple method of control for a radiant electric air heater to permit of simulating the operation of a gas radiant heater.

In practicing my invention, I provide a plurality of electric heating elements, each of which has connected in series-circuit relation therewith, an adjustable resistor.

The amount of resistance varies progressively and proportionately from the one to the other of the heating elements and is a maximum at the uppermost element and a minimum at the lowermost element. These resistors may be cut out from, or inserted in, the circuit by suitable means and the amounts of resistance cut out or inserted in the several circuits varies progressively and proportionately from the one to the other of the heating elements.

In the single sheet of drawings,

Figure 1 is a view, in front elevation, of an electric air heater with which the method of control embodying my invention may be practiced.

Fig. 2 is a top plan view of a rheostat with the cover removed, with which my control method may be effected.

Fig. 3 is a view, in lateral section therethrough, taken on the line III—III of Fig. 2 and Fig. 4 is a schematic representation of a diagram of connections embodying my invention.

An electric air heater 11 comprises a suitable casing 12 that may be constructed in any desired manner and that may be of any suitable dimensions and contour. A base 13, having a plurality of supporting members 14, carries the casing 12. A top member 15 is provided for the casing 12 and the design of these parts is such as to provide an electric air heater of ornamental and pleasing appearance.

A plurality of electric heating elements 16 are supported in the casing 12 in any suitable or desired manner, as by being mounted on a refractory plate of electric insulating material. The individual heating elements may be of any suitable or desired construction and are here illustrated as comprising helically wound coils of a suitable resistor wire. As the construction of the individual heating elements and their mounting within the casing forms no part of my invention, it is not thought necessary to illustrate or to describe these features in detail.

An ornamental and protective grating 17 is provided in front of the heating elements 16 in order to protect them and to preclude accidental contact therewith, while they are energized.

A rheostat member 18 is located in any suitable or desired position, preferably within the casing 12 and, as illustrated in Fig. 1 of the drawing, it may be located in the bottom part of the casing and be provided with a hand wheel 19 projecting therethrough to permit of operating the same. The rheostat 18 comprises a substantially circular refractory plate 21, of electric-insulating material, having located thereon a plurality of resistor members here designated by the numerals 22 to 27, inclusive, that may severally comprise helically wound coils of a suitable resistor material. A plurality of concentric grooves 28 are provided in the face of the member 21 in which the coils 22 to 27 may be suitably mounted.

Annular conductor bars 29 are provided and are located closely adjacent to the resistor members. A rheostat arm 31 is provided with a plurality of resilient contact members 32 that severally engage one of the annular bars 29 and one of the resistors 22 to 27, inclusive. The arm 31 and the handwheel 19 are mounted on a suitable shaft 33, and a cover member 34 is provided for the rheostat.

By providing a rheostat of substantially circular form and by employing substantially the same size of resistor wire in the various resistors 22 to 27, inclusive, it is apparent that the resistance provided by the resistor 27 is very much greater than that provided by the resistor 22. It is understood, of course, that as many individual resistors are provided as there are individual heating elements or circuits, substantially as schematically illustrated by the diagram of connections in Fig. 4 of the drawing. One of the heating elements 16 is connected in series circuit relation relatively to one of the resistors and one of the ends of each of the heating elements 16 are connected together and to a conductor 35, by means of which they are connected to a suitable supply circuit conductor 36, the other conductor 37 of the circuit being connected to the arm 31.

When the arm 31 is in its off position, as indicated in Fig. 4, no current will traverse the heating elements. When the arm is moved to the position indicated by the broken line L, a relatively small current traverses each of the respective heating elements and resistors. With the arm L in this position the current is lowest in value for the uppermost heating element 16 and is highest in value for the lowermost heating element 16 and varies proportionately therebetween. The heating elements in Fig. 4 are illustrated in substantially the positions they actually occupy in the assembled heater. By moving the arm 31 to the position indicated by the broken line M, more resistance is cut out from the circuit and a larger amount is cut out from the uppermost circuit, this amount decreasing for the other heating elements located therebelow.

When the lever 31 is moved to the position indicated by the line marked H, all of the resistance is cut out from all of the resistors and the individual heating elements are intended to be fully energized.

The hereinbefore described operation thus simulates the operation of a gas radiant heater when the amount of gas permitted to be burned is caused to be increased from a relatively small amount, under which conditions only the lower part of the heater glows, until a maximum amount of gas is being burned when the entire front surface of the gas heater is radiant to substantially the same degree of luminosity.

By moving the lever 31 in a direction opposite to that hereinbefore described, the operation of a gas heater when the amount of gas is decreased is simulated. It may be noted that any energy dissipated in the rheostat is effective to heat the room in which the device is located and is, therefore not lost.

The method disclosed and claimed in the present application may be employed with the radiant electric heaters disclosed and claimed in my copending application Serial No. 640,054 filed May 19, 1923, application Serial No. 641,054 filed May 24, 1923, and application Serial No. 651,654 filed July 14, 1923, all of which are assigned to the Westinghouse Electric & Manufacturing Company.

While I have illustrated a particular embodiment of an adjustable rheostat with which my method may be practiced, I do not desire to be limited thereto, as this has been illustrated to explain my method and the same effect may be obtained in other ways.

Various modifications and changes may be made without departing from the spirit and scope of the invention, and I desire, therefore, that only such limitations shall be placed thereon as are imposed by the prior art or set forth in the appended claims.

I claim as my invention:

1. The method of controlling the energization of a plurality of radiant electric heating elements, located in superposed, parallel-spaced relation relatively to each other to simulate the action of a radiant gas heater, which comprises the simultaneous insertion of variable resistors in series-circuit relation with the individual heating elements, the amount of resistance thus inserted being a maximum for the top heating element and decreasing in predetermined and proportionate amounts for the other heating elements.

2. The method of controlling a plurality of electric heating elements having a resistor connected in series-circuit relation relatively to each of the elements which comprises simultaneously cutting out progressively and proportionately varying amounts of resistance from the circuits of the individual heating elements, to simulate the action of a radiant gas heater when the amount of gas being burned is gradually increased.

3. The method of controlling a plurality of electric heating elements in an air heater casing having a resistor connected in series-circuit relation with each of the elements which comprises simultaneously cutting out progressively and proportionately varying amounts of resistance from the circuits of the individual heating elements, the variation being in accordance with the location of the individual heating elements in said casing.

In testimony whereof, I have hereunto subscribed my name this 11th day of July, 1923.

VICTOR G. VAUGHAN.